United States Patent
Hanaoka et al.

(10) Patent No.: US 7,757,388 B2
(45) Date of Patent: Jul. 20, 2010

(54) APPARATUS FOR SUPPLYING AND PRESS-FITTING PART TO WORK

(75) Inventors: Tadashi Hanaoka, Tokyo (JP); Shuichi Maruyama, Tokyo (JP); Toshirou Higuma, Tokyo (JP); Yoshiharu Iwai, Aichi (JP)

(73) Assignees: Honda Motor Co., Ltd., Tokyo (JP); Iwata Koki Co., Ltd., Nagoya (JP)

( * ) Notice: Subject to any disclaimer, the term of this patent is extended or adjusted under 35 U.S.C. 154(b) by 614 days.

(21) Appl. No.: 11/513,279

(22) Filed: Aug. 31, 2006

(65) Prior Publication Data
US 2007/0056161 A1 Mar. 15, 2007

(30) Foreign Application Priority Data
Sep. 2, 2005 (JP) ............................. 2005-254251

(51) Int. Cl.
*B23P 21/00* (2006.01)
(52) U.S. Cl. ................... 29/790; 29/788; 29/281.5; 29/464
(58) Field of Classification Search ................. 29/771, 29/787, 788, 790, 818, 281.5, 898.09, 407.1, 29/464, 525
See application file for complete search history.

(56) References Cited

U.S. PATENT DOCUMENTS

| | | | | |
|---|---|---|---|---|
| 4,002,516 A | * | 1/1977 | Gaborieau et al. | 156/69 |
| 4,283,847 A | * | 8/1981 | May | 29/832 |
| 4,347,660 A | * | 9/1982 | Cannon et al. | 408/31 |
| 4,706,353 A | * | 11/1987 | Zgliczynski et al. | 29/888.025 |
| 4,791,715 A | * | 12/1988 | Lovelace | 29/464 |
| 4,821,408 A | * | 4/1989 | Speller et al. | 29/701 |
| 4,896,712 A | * | 1/1990 | du Quesne | 157/1.24 |
| 4,905,423 A | * | 3/1990 | van Laere | 451/461 |
| 4,945,631 A | * | 8/1990 | Banner et al. | 29/705 |
| 5,076,149 A | * | 12/1991 | Everts | 92/208 |
| RE34,224 E | * | 4/1993 | Guntly et al. | 29/888.01 |
| 5,509,192 A | * | 4/1996 | Ota et al. | 29/741 |
| 5,519,932 A | * | 5/1996 | Kuze | 29/564.1 |

(Continued)

FOREIGN PATENT DOCUMENTS

JP 04-275836 A 10/1992

(Continued)

*Primary Examiner*—David P Bryant
*Assistant Examiner*—Christopher M Koehler
(74) *Attorney, Agent, or Firm*—Birch, Stewart, Kolasch & Birch, LLP

(57) ABSTRACT

This part supplying and press-fitting apparatus for supplying an annular part to a predetermined position and press-fitting the part into a press-fit hole of a work in a state of being positioned in a circumferential direction includes a grip device for gripping the part; a rotation device for rotating the grip device around a hole axis of the part in a state of having gripped the part; a detection device for detecting the detected portion of the part being rotated by the rotation device; a stop device for stopping the rotation of the grip device when the detected portion is detected; a move device for moving the grip device stopped by the stop device to the predetermined position; and a press-fit head configured to descend to the predetermined position and to press-fit the part into a press-fit hole of the work.

14 Claims, 6 Drawing Sheets

U.S. PATENT DOCUMENTS

| | | | | |
|---|---|---|---|---|
| 5,619,782 | A * | 4/1997 | Tanaka et al. | 29/407.1 |
| 5,865,645 | A * | 2/1999 | Embo et al. | 439/567 |
| 5,893,203 | A * | 4/1999 | Buttrick Jr. | 29/407.05 |
| 6,047,472 | A * | 4/2000 | Koch et al. | 29/888.01 |
| 6,138,340 | A * | 10/2000 | Yoshida | 29/468 |
| 6,138,342 | A * | 10/2000 | Kuze | 29/564.1 |
| 6,352,008 | B1 * | 3/2002 | Matsuoka et al. | 74/433.5 |
| 6,568,080 | B2 * | 5/2003 | Kimmel et al. | 29/890.124 |
| 6,877,201 | B2 * | 4/2005 | Gunshinan et al. | 29/407.01 |
| 6,932,647 | B2 * | 8/2005 | Murayama | 439/607 |

FOREIGN PATENT DOCUMENTS

| | | |
|---|---|---|
| JP | H05-3627 | 1/1993 |
| JP | 07-009273 | 1/1995 |
| JP | 09-057555 | 3/1997 |
| JP | 11-010464 | 1/1999 |
| JP | 2000-094235 | 4/2000 |
| JP | 2002-054564 | 2/2002 |
| JP | 2004-188556 | 7/2004 |

* cited by examiner

APPARATUS FOR SUPPLYING AND PRESS-FITTING PART TO WORK

BACKGROUND OF THE INVENTION

1. Field of the Invention

The present invention relates to an apparatus for supplying and press-fitting a part to a work.

2. Description of the Related Art

FIG. 8 is an appearance perspective view around a smaller end of a connecting rod W, which is a component of an engine of such a vehicle, and a bush P press-fitted into the smaller end. FIG. 9 shows a section of a main portion of the bush P. On an inner peripheral face of the bush P is formed an oil groove Pa. In press-fitting such the bush P into a press-fit hole Wa of the connecting rod W, it is requested to strictly positioning a position and direction of the oil groove Pa and thereafter to press-fit the bush P into the hole Wa. In another process after the press-fit, an oil hole is integrally drilled that fronts the oil groove Pa of the bush P from an outside face of the smaller end of the connecting rod W.

A conventional method of supplying and press-fitting the bush P into the connecting rod W consists of: firstly detecting a cutout Pc of a detected portion provided at an edge of the bush P and positioning the bush P; next gripping and supplying the bush P to a press-fit head apparatus by robot arm functioning as a transfer apparatus; and press-fitting the bush P into the connecting rod W. Meanwhile, another conventional example relating to a press-fit apparatus is described in Japanese Patent Laid-Open Publication No. H 04-275836 (paragraph 0011, FIG. 1).

In the conventional method of supplying and press-fitting the bush P, because the bush P slightly oscillates in some case in a grip operation and release operation of a grip claw of a robot arm, the bush P may be displaced and press-fitted due to the oscillation after being positioned, in spite of having taken the trouble to position the bush P, in a configuration of making the robot arm intervene. Meanwhile, in the Japanese Patent Laid-Open Publication No. H 04-275836, if although there is no description relating to a positioning device because of a part needless of positioning, there is a need for the positioning, it is assumed that there will occur the similar problem in a case that the positioning device is provided at a more upstream side than an X-Y robot handling apparatus described in the paragraph [0011] of the H 04-275836. In addition, in the conventional method of supplying and press-fitting the bush P, because an optical sensor such as a laser sensor is used as a sensor for detecting the cutout Pc, there also exists a problem that a whole system is apt to become expensive.

Consequently, when positioning an annular part in a circumferential direction and thereafter supplying and press-fitting the part to a work, there is a need for an apparatus for supplying and press-fitting the part (hereinafter referred to as part supplying and press-fitting apparatus as needed) that reduces a positional displacement in a supply process and is also economical.

SUMMARY OF THE INVENTION

In order to solve the problems, the present invention provides a part supplying and press-fitting apparatus for supplying an annular part to a predetermined position and press-fitting the part into a press-fit hole of a work in a state of being positioned in a circumferential direction, wherein the positioning is performed by detecting a detected portion formed in the part, the apparatus comprising: a grip device for gripping the part; a rotation device for rotating the grip device around a hole axis of the part in a state of having gripped the part; a detection device for detecting the detected portion of the part being rotated by the rotation device; a stop device for stopping the rotation of the grip device when the detected portion is detected; a move device for moving the grip device stopped by the stop device to the predetermined position; and a press-fit head configured to descend to the predetermined position and to press-fit the part into a press-fit hole of the work.

In accordance with the part supplying and press-fitting apparatus, a part is preferably positioned in a circumferential direction by the rotation device, the detection device, and the stop device; the part is always gripped after the positioning until it is received by the press-fit head. Accordingly, a positional displacement after the positioning becomes difficult to occur, and the part is press-fitted into the press-fit hole of the work in a normal direction.

In addition, the present invention is a part supplying and press-fitting apparatus having a configuration that: the grip device consists of a chuck device for placing a part on a placement table face, making a hole direction a perpendicular direction, and gripping an outer peripheral face of the part; the detected portion consists of a cutout formed at a rim of the part; and the detection device freely ascends and descends, is contacted with a pressure to the rim in descent, and comprises a detection member that can engage with the cutout.

In accordance with the part supplying and press-fitting apparatus, because the chuck device preferably grips a part with placing it on the placement table face, a stability of the part grip increases and the detection device comes off with a simple structure; thus the apparatus becomes economical one.

In addition, the present invention is a part supplying and press-fitting apparatus comprising an arm device having an arm portion for receiving and gripping a part supplied from a part feeder side, reversing the part by 180° around a shaft of a horizontal direction, and handing the part to the chuck device.

In accordance with the part supplying and press-fitting apparatus, by preferably swiveling the arm portion, it is possible to place a part on the placement table face without making the part, which is supplied from the part feeder side intervene, with a grip portion of the chuck device.

In addition, the present invention is a part supplying and press-fitting apparatus, wherein a supply path of a part is formed in a line from a position, where the arm portion of the arm device receives the part, to the predetermined position below the press-fit head, seen in a plan view.

In accordance with the part supplying and press-fitting apparatus, the apparatus preferably becomes compact in the apparatus size, and in particular, in a case of providing a plurality of supplying and press-fitting lines side by side, each of the lines can be densely adjacent.

In addition, the present invention is a part supplying and press-fitting apparatus, wherein the work is a connecting rod, which is a component of an engine of a vehicle, and the part is a bush.

In accordance with the part supplying and press-fitting apparatus, it is possible to preferably improve an assembling accuracy in an assembling process of a connecting rod and a bush.

BEST MODE FOR CARRYING OUT THE INVENTION

Figure 1:
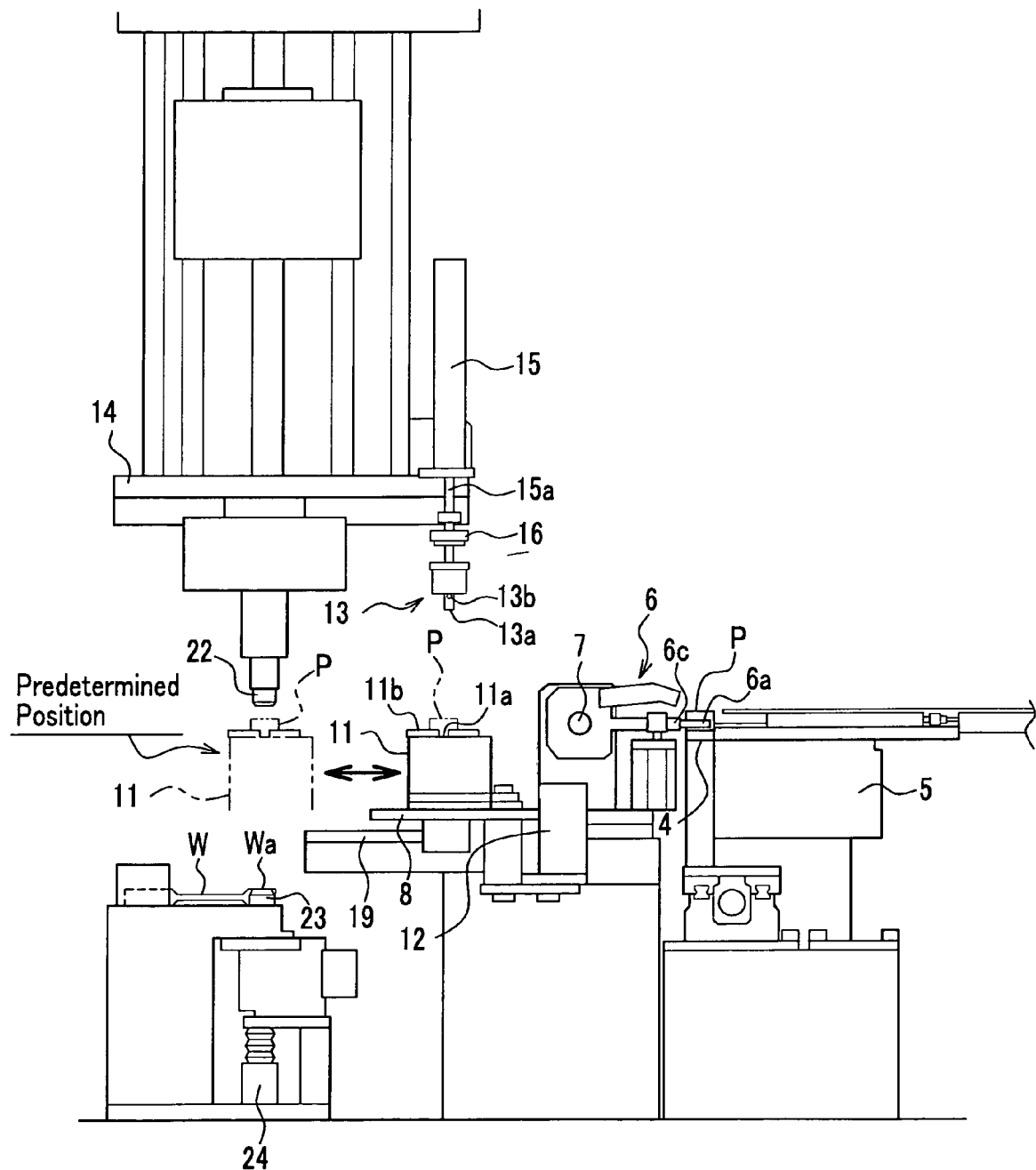
FIG. 1 is a side illustration drawing of a part supplying and press-fitting apparatus related to the present invention.
Figure 2:
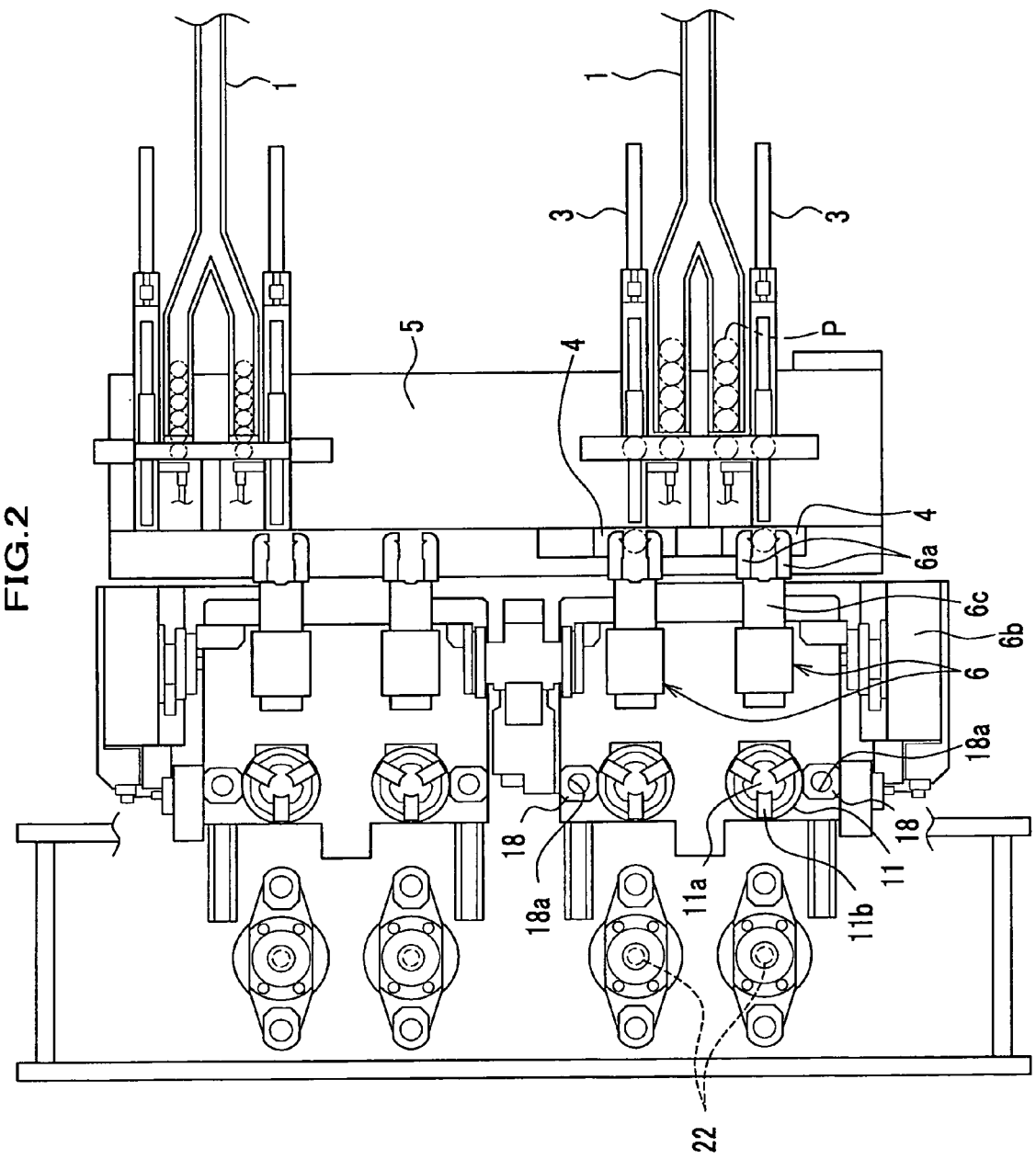
FIG. 2 is a plan illustration drawing of a part supplying and press-fitting apparatus related to the present invention.
Figure 3:
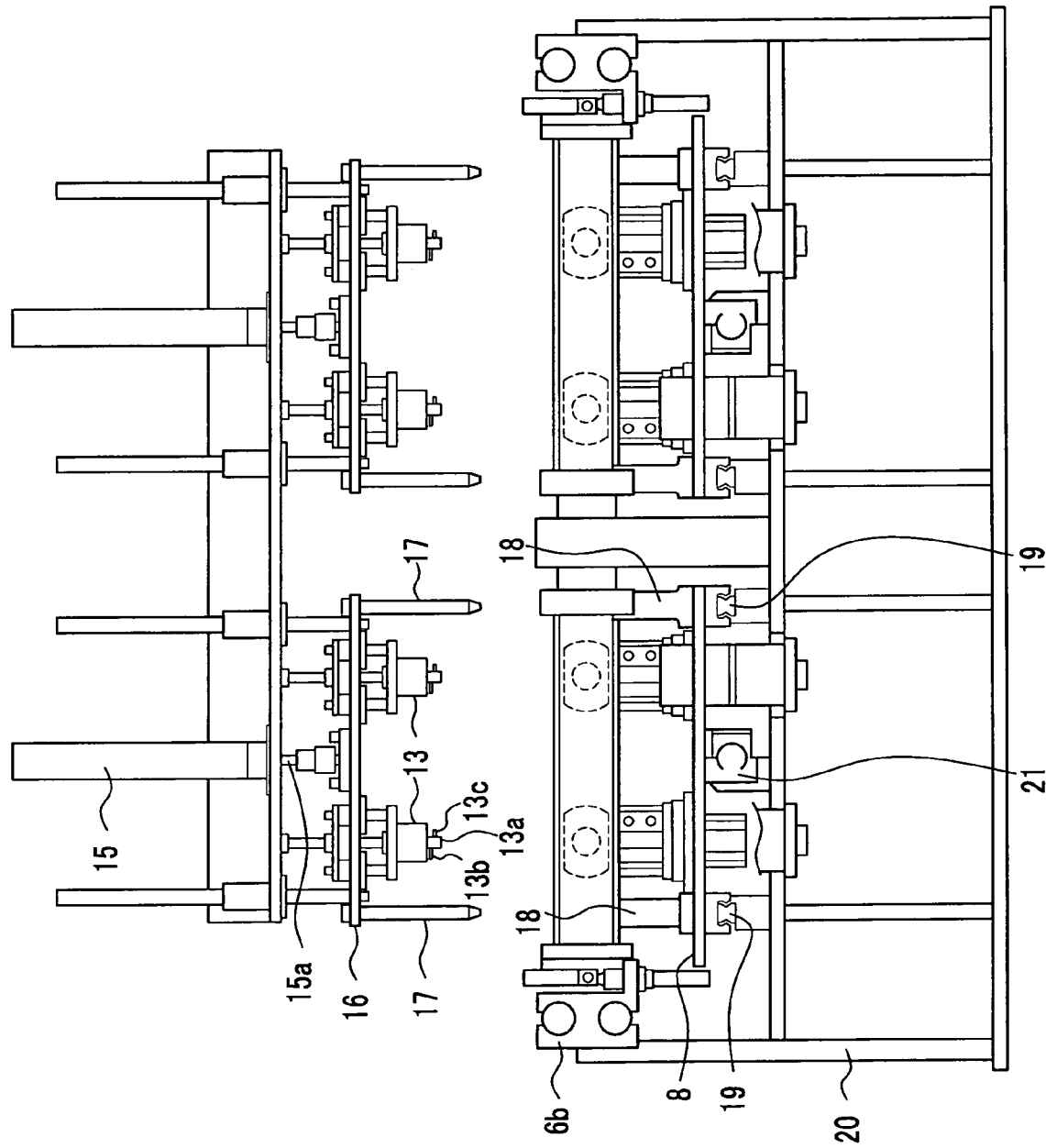
FIG. 3 is a front illustration drawing of a part supplying and press-fitting apparatus related to the present invention.
Figure 8:
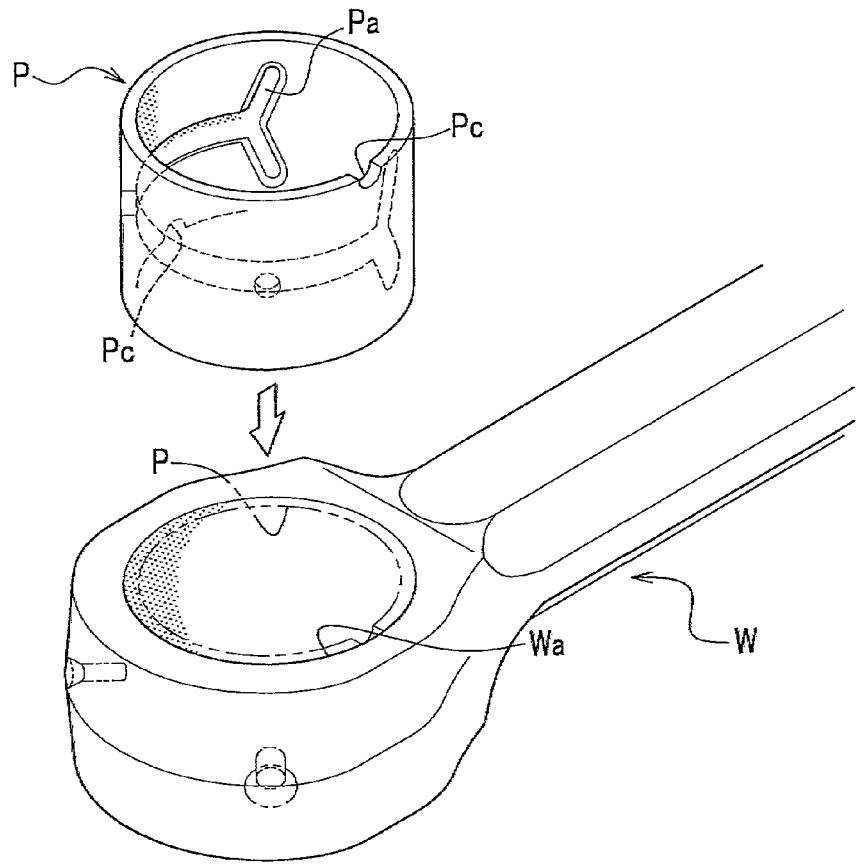
FIG. 8 is an appearance perspective view of a periphery of a smaller end of a connecting rod, which is a component of an engine of such a vehicle, and a bush press-fitted into the smaller end.
Figure 9:
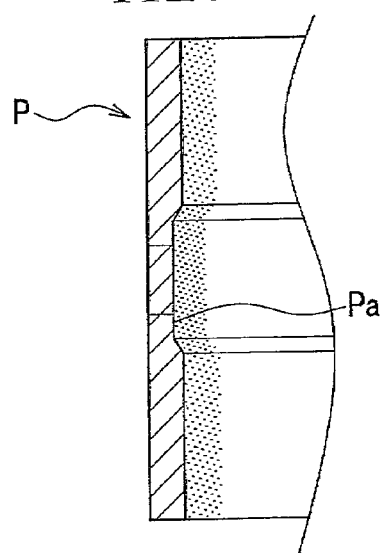
FIG. 9 is a section drawing of a main portion of the bush shown in FIG. 8.

Here will be described a part supplying and press-fitting apparatus in a case of assuming a part and a work to be respectively the bush P and the connecting rod W shown in FIG. 8. FIGS. 1 to 3 are respectively side, plan, and front illustration drawings of the part supplying and press-fitting apparatus related to the present invention.

In FIG. 2 symbols 1 respectively show supply lanes of bushes P linked to a part feeder not shown. Each bush P is conveyed in a single row in each of the supply lanes 1, making its hole direction a perpendicular direction. A downstream side of the supply lane 1 is forked into two, and the bush P is appropriately distributed to either of the two lanes. Receiving a check of a presence or absence, the bush P discharged from a downstream end of each of the two-forked lanes of the supply lane 1 is then conveyed outward a left or right direction (up or down direction in FIG. 2), next contacted with a pressure by a cylinder 3, and sent into a distribution platform 4, which is a receiving position of the bush P of an arm device 6 described later in detail.

Figure 4:
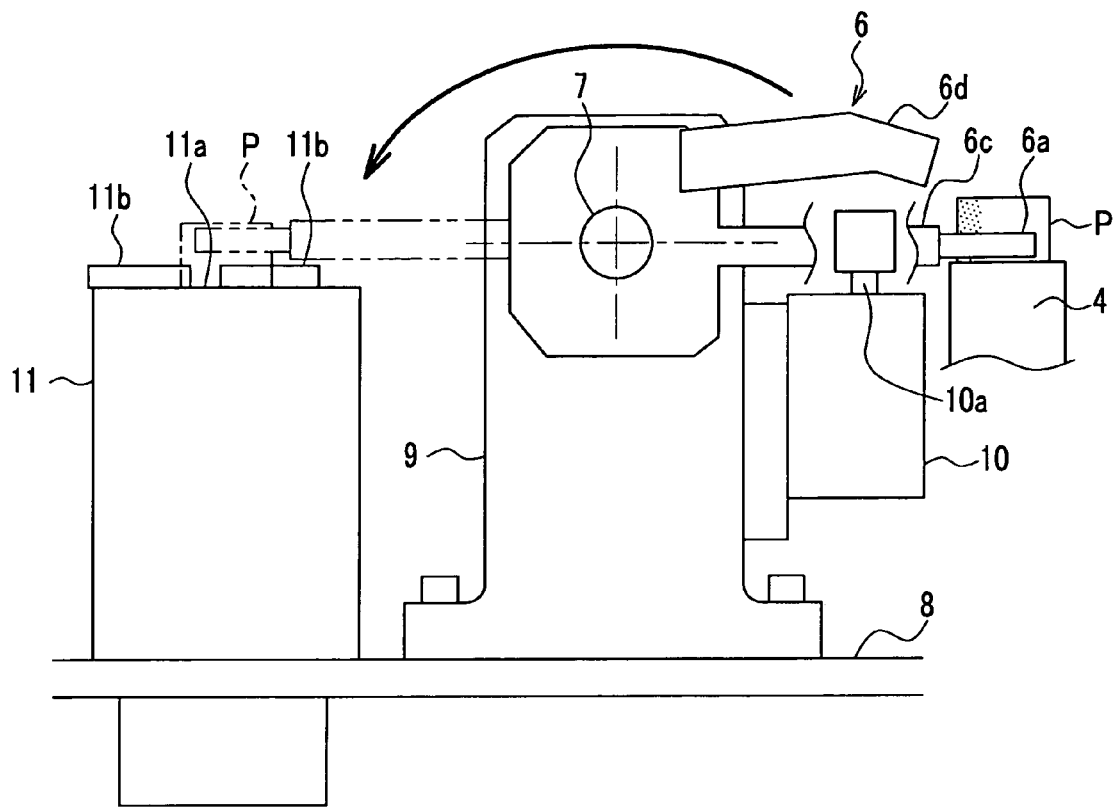
FIG. 4 is an enlarged side illustration drawing of an arm device and a chuck device.

FIG. 2 shows a case of providing side by side two supply lanes 1 forked into two; accordingly, hereafter a supplying and press-fitting line of the bush P is configured with four systems of a same configuration. However, the two supply lanes 1 respectively handle the bushes P of different sizes: in FIG. 2 left two supplying and press-fitting lines are for the bush P of a smaller diameter; right two supplying and press-fitting lines are for the bush P of a larger diameter. In addition, each of such the supply lanes 1 and the distribution platforms 4 is attached to a freely movable counter 5 in the left or right direction (up or down direction in FIG. 2), and is designed so that only one of the supply lanes 1 is connected to supplying and press-fitting lines at downstream side by the counter 5 moving. In order to operate the supplying and press-fitting lines for the larger diameter, FIG. 2 shows a case of connecting the right supply lane 1 to the supplying and press-fitting lines at the downstream side As described above, because the supplying and press-fitting lines of the four systems are respectively the same configuration except for a diameter difference of the bush P, hereafter one system only is mainly described. A symbol 6 shows an arm device having an arm portion 6c for receiving and gripping the bush P supplied from a part feeder side, to be more precise, the bush P on the distribution platform 4, reversing the bush P by 180° around a shaft 7 (FIG. 4) of a horizontal direction, and handing the bush P to a chuck device 11 described later in detail. A symbol 6b shows a rotation drive source of the arm device 6. FIG. 4 is the enlarged side illustration drawing of the arm device 6 and the chuck device 11. In FIG. 4 the arm portion 6c grips an outer peripheral face of the bush P on the distribution platform 4 by a pair of grip claws 6a, reverses the bush P by 180° (reversed state is shown in a virtual line) to an upper side around the shaft 7 formed in a pedestal 9 on a base frame 8, and places the bush P on a placement table face 11a of the chuck device 11.

Figure 5:
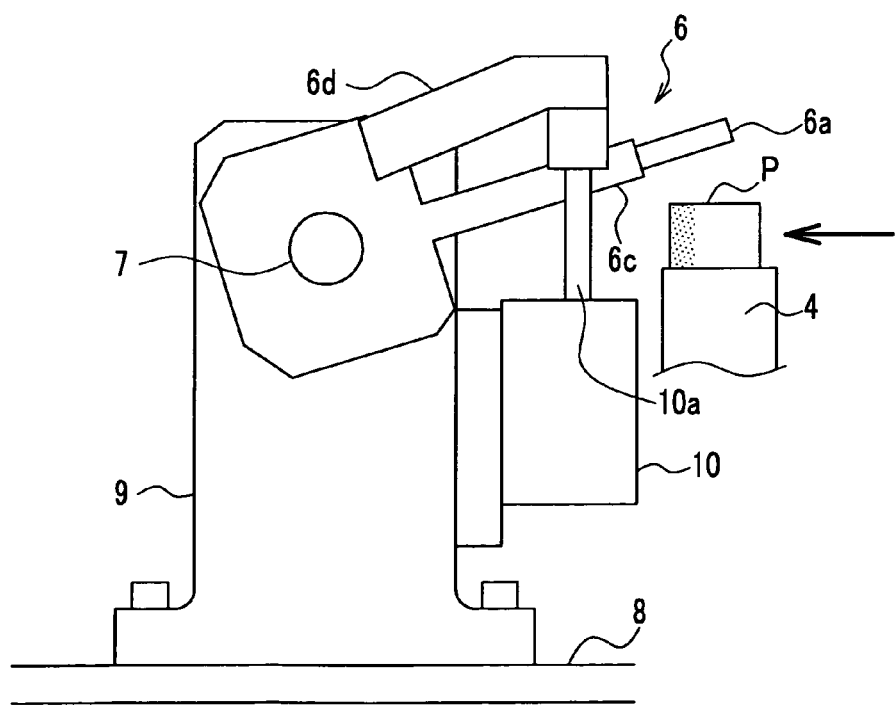
FIG. 5 is an enlarged side illustration drawing of an arm device abutting with a stopper and being in a waiting state.

Meanwhile, when the bush P is conveyed to the distribution platform 4, as shown in FIG. 5, a rod 10a of a cylinder 10 attached to the pedestal 9 extends, a tip of the rod 10a abuts with a stopper 6d, and thereby the grip claws 6a become in a state of waiting at an upper position than a receiving position of the bush P. Then if the bush P is positioned at the distribution platform 4, the rod 10a is retracted, and thereby, as shown in 4, the grip claws 6a descend and become a state of being able to receive the bush P.

Next, the chuck 11 comprises the placement table face 11a for placing the bush P, making its hole direction the perpendicular direction; and a chuck block 11b for gripping the outer peripheral face of the bush P placed on the face 11a. As shown in FIG. 2, three chuck blocks 11b are radially arranged at an equal interval in a plan view, and grips the outer peripheral face of the bush P by moving to a center side in a radial direction in synchronization.

In FIG. 4 the chuck device 11 is configured to rotate around a shaft of a perpendicular direction above the base frame 8 by a drive source 12 (FIG. 1) and a gear transmission device attached to the base frame 8.

As shown in FIG. 1, above the chuck device 11 is positioned a detector 13. A fixed frame body 14 is arranged above the chuck device 11, and to the body 14 is attached a cylinder 15 with its rod 15a being downward in the perpendicular direction. The detector 13 is configured to freely ascend and descend by being attached to a lower end of the rod 15a. Meanwhile, in the embodiment, as shown in FIG. 3, in order to handle the supplying and press-fitting lines of two adjacent systems by one cylinder 15, a base plate 16 is attached to a lower end of the rod 15a, and to the plate 16 are attached two detectors 13. In addition, to the base plate 16 are fixed a pair of guide bars 17 downward, and when the detectors 13 descend, the bars 17 are configured to respectively fit in guide holes 18a (FIG. 2) of blocks 18 fixed on the base frame 8. Thus is prevented a relative positional displacement between the bush P gripped by the chuck device 11 and the detectors 13.

Figure 6:
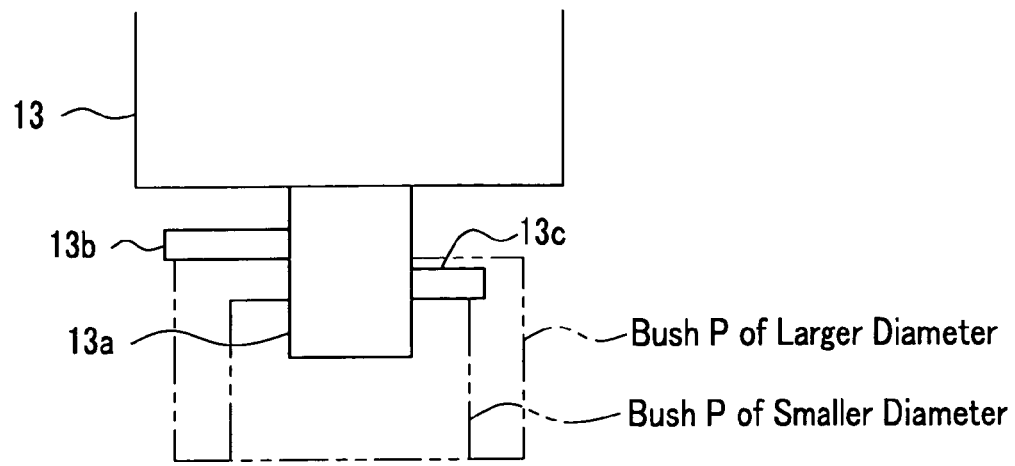
FIG. 6 is an enlarged illustration drawing of a detector.

FIG. 6 is an enlarged illustration drawing of one of the detectors 13 shown in FIG. 3. On a bottom face of the detector 13 is protruded a shaft 13a of a coaxial shaft with a hole axis of the bush P positioned below, and to the shaft 13a is horizontally attached a detection pin 13b. The shaft 13a is kept pushed downward by a pushing device not shown with respect to a main body portion of the detector 13. Meanwhile, a symbol 13c is a detection pin for the bush P of a smaller diameter: the detection pin 13c is shorter than the detection pin 13b for the bush P of a larger diameter, and in addition, is attached to the shaft 13a at a lower position than the pin 13b.

When a tip periphery of the detection pin 13b is descended by the rod 15a of the cylinder 15 shown in FIG. 3 being extended, it is contacted to an upper rim of the bush P with a pressure by the energizing device. Then as described above, the chuck device 11 (FIG. 1) rotates and thereby the bush P rotates, and when the cutout Pc (FIG. 8) is positioned below the detection pin 13b, the pin 13b is configured so that its tip periphery engages with the cutout Pc by an energizing force of the energizing device. In other words, the detection pin 13b has a function similar to a switch member of a limit switch.

Accordingly, for example, by observing a displacement of the shaft 13a at that time, the cutout Pc of the bush P can be detected.

Next, if in FIG. 1 the cutout Pc (FIG. 8) of the bush P is detected by the detector 13, the chuck device 11 is configured to stop its rotation by the drive stop of the drive source 12. Then if the rotation of the chuck device 11 is stopped, a drive source 21 provided at a counter 20 in FIG. 3 is driven, the base frame 8 is moved on a conveyor rail 19, and thereby the chuck device 11 progresses to a predetermined position just below a press-fit head 22 as shown in FIG. 1 in a virtual line.

Figure 7:
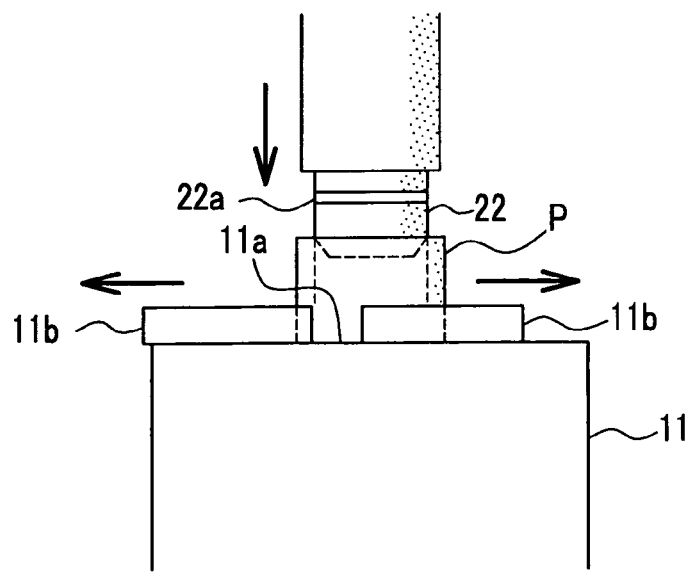
FIG. 7 is a side illustration drawing showing a manner of a bush being received by a press-fit head.

FIG. 7 is a side illustration drawing showing a manner of the bush P being received by the press-fit head 22. On an outer peripheral face of the press-fit head 22 is attached an annular packing 22a, and when the press-fit head 22 descends and enters in the hole of the bush P, it is designed to receive the bush P from the chuck device 11 by friction force acting between the packing 22a and the bush P. Then the press-fit head 22 press-fits the received bush P into the press-fit hole Wa of the connecting rod W. As shown in FIG. 1, the press-fit head 22 is attached to the fixed frame body 14 so as to freely ascend and descend.

Here will be described a series of operations of the supplying and press-fitting apparatus of the embodiment. In FIG. 2 the bush P discharged from the downstream end of each two-forked lane of the supply lanes 1 receives a check of a presence or absence, then conveyed outward a left or right direction, next contacted with a pressure by the cylinder 3, and sent into the distribution platform 4.

If the arm portion 6c of the arm device 6 grips the bush P on the distribution platform 4 by the grip claws 6a at the tip of the portion 6c, it reverses the bush P by 180° around the shaft 7 (FIG. 4) and places the bush P at the center of the placement table face 11a of the chuck device 11. Because the arm portion 6c swivels, the bush P and the chuck blocks 11b of the chuck device 11 do not intervene with each other. Next, the chuck blocks 11b of the chuck device 11 are actuated and grip the bush P. About that time the gripping by the grip claws 6a is released, and the arm device 6 swivels until a waiting position shown in FIG. 5 and prepares for a next bush P.

If the bush P is gripped by the chuck blocks 11b, the detector 13 descends and the tip periphery of the detection pin 13b is contacted to the upper rim of the bush P with a pressure by the energizing device. When the detector 13 descends, the guide bar 17 fits in the guide hole 18a of the block 18, a positional displacement between the bush P gripped by the chuck blocks 11b and the detector 13 is surely prevented.

Next, the chuck device 11 as well as the bush P rotate at a slow speed by the drive of the drive source 12; when the cutout Pc (FIG. 8) reaches below the detection pin 13b and the pin 13b engages with the cutout Pc, positioning the bush P in a circumferential direction is assumed to be performed, the drive source 12 is stopped, and the rotation of the chuck device 11 stops. If the rotation of the chuck device 11 stops, the detector 13 ascends, waits, and the chuck device 11 then progresses to a predetermined position just below the press-fit head 22 by the drive of the drive source 21.

If the chuck device 11 reaches the predetermined position just below the press-fit head 22, the head 22 descends, enters inside the bush P, and receives the bush P by friction force acting between the packing 22a (FIG. 7) and the bush P. At this time a timing of the grip of the bush P being released by the chuck device 11 (chuck blocks 11b) is two: (1) the grip by the chuck device 11 is released before the press-fit head 22 receives the bush P; and (2) the grip by the chuck device 11 is released after the press-fit head 22 receives the bush P.

Conventional, as described above, after being positioned, the bush P is transferred by robot, and because at that time the bush P oscillates in a grip operation and release operation of grip claws of a robot arm, the position of the bush P is apt to be displaced; whereas, in the embodiment, because the bush P is always placed on the placement table face 11a of the chuck device 11 until it is received by the press-fit head 22, the oscillation is difficult to occur. Accordingly, a positional displacement does not substantially occur at the timing of the above (1); if at the timing of the above (2), because the posture of the bush P is always regulated by the chuck blocks 11b and the press-fit head 22, the positional displacement becomes more difficult to occur. In the embodiment the timing of the grip being released by the chuck blocks 11b is assumed to be the same as that of receiving the press-fit head 22.

Next, in FIG. 1 the press-fit head 22 having received the bush P slightly ascends; on the other hand, the chuck device 11 retreats and waits below the detector 13. If the chuck device 11 retreats, the press-fit head 22 descends and starts to press-fit the bush P with a predetermined pressure into the press-fit hole Wa of the connecting rod W waiting below. Meanwhile, at this time a positioning guide pin 23 entered into the press-fit hole Wa of the connecting rod W is lost by press-fit force and descends while retracting an air cylinder 24.

Thus if a supplying and press-fitting apparatus comprises: the grip device (chuck device 11) for gripping the bush P; the rotation device (drive source 12) for rotating the grip device (chuck device 11) around the hole axis of the bush P; the detection device (detector 13) for detecting the detected portion (cutout Pc) of the bush P being rotated by the rotation device (drive source 12); the stop device (drive source 12) for stopping the rotation of the grip device (chuck device 11) when the detected portion (cutout Pc) is detected; the move device (drive source 21) for moving the grip device (chuck device 11) stopped by the stop device (drive source 12) to a predetermined position; and the press-fit head 22 configured to descend to the predetermined position, to receive the bush P from the grip device (chuck device 11), and to press-fit the bush P into the press-fit hole Wa of the connecting rod W, positioning the circumferential direction of the bush P is performed by the rotation device (drive source 12), the detection device (detector 13), and the stop device (drive source 12), and after the positioning until the bush P is received by the press-fit head 22, the bush P is always gripped by the grip device (chuck device 11). Accordingly, a positional displacement after the positioning becomes difficult to occur, and the bush P is press-fitted in a normal direction into the press-fit hole Wa of the connecting rod W.

In addition, as in the embodiment, if a configuration is assumed that: the grip device consists of the chuck device 11 for placing the bush P on the placement table face 11a with making the hole direction the perpendicular direction, and gripping the outer peripheral face of the bush P; the detected portion consists of the cutout Pc formed on the rim of the bush P; the detection device freely ascends and descends, is contacted with a pressure to the rim of the bush P in descent, and comprises the detection pin 13b that can engage with the cutout Pc, because the bush P is gripped while being placed on the placement table face 11a, the gripped stability of the bush P increases and the detection device comes off with a simple structure; thus the part supplying and press-fitting apparatus becomes economical one.

Moreover, if the part supplying and press-fitting apparatus further comprises the arm device 6 having the arm portion 6c for receiving and gripping the bush P supplied from a part feeder side, reversing the bush P by 180° around the shaft of the horizontal direction, and handing the bush P to the chuck device 11, it is possible to place the bush P on the placement table face 11a without making the bush P, which is supplied from the part feeder side, intervene with the grip portion (chuck blocks 11b) of the chuck device 11 by swiveling the arm portion 6c.

In addition, as understood from FIG. 2, if the supply path of the bush P is configured, seen in a plan view, to be formed in a line from a position (position of the distribution platform 4), where the arm portion 6c of the arm device 6 receives the bush P, to a predetermined position below the press-fit head 22, the part supplying and press-fitting apparatus becomes compact one; in particular, as in the embodiment, in a case of providing a plurality of supplying and press-fitting lines side by side, each of the lines can be densely adjacent.

Thus the best mode of the present invention has been described. The present invention is not limited to a bush press-fitted into a connecting rod as in the embodiment, and is applicable to an annular part requested for being positioned in a circumferential direction and press-fitted.

What is claimed is:

1. A part supplying and press-fitting apparatus for supplying an annular part to a predetermined position and press-fitting the part into a press-fit hole of a work in a state of being positioned in a circumferential direction, the positioning being performed by detecting a detected portion formed in the part; the apparatus comprising:
    a grip device configured to grip the part;
    an arm device having an arm portion configured to receive and grip the part supplied from a part feeder side, reversing the part by 180° around a shaft of a horizontal direction, and to hand the part to the grip device;
    a rotation device configured to rotate the grip device around a hole axis of the part in a state of having gripped the part;
    a detection device configured to detect the detected portion of the part being rotated by the rotation device;
    a stop device configured to stop the rotation of the grip device when the detected portion is detected;
    a move device configured to move the grip device stopped by the stop device to the predetermined position; and
    a press-fit head configured to descend to the predetermined position and press-fit the part into a press-fit hole of the work,
    wherein the grip device consists of a chuck device configured to place the part on a placement table face, to make a hole direction perpendicular to the placement table face, and to grip an outer peripheral face of the part,
    wherein the grip device is adapted to continuously grip the part during rotation of the grip device, during detection of the detected portion, and during movement of the grip device to the predetermined position, thereby preventing positional displacement of the part, and enabling the part to be properly press-fitted into the press-fitting hole,
    wherein the detected portion consists of a cutout formed at a rim of the part, and wherein the detection device freely ascends and descends, is contacted with a pressure to the rim in descent, and comprises a detection member that engages with the cutout.

2. The part supplying and press-fitting apparatus according to claim 1, wherein the chuck device includes chuck blocks arranged at equal intervals around a circumference of the part.

3. The part supplying and press-fitting apparatus according to claim 1, wherein seen in a plan view, a supply path of the part is formed in a line from a position, where the arm portion of the arm device receives the part, to the predetermined position below the press-fit head.

4. The part supplying and press-fitting apparatus according to claim 1, wherein the work is a connecting rod, which is a component of an engine of a vehicle, and the part is a bush.

5. The part supplying and press-fitting apparatus according to claim 1, wherein the shaft is formed in a pedestal which is disposed between the part feeder side and the grip device.

6. The part supplying and press-fitting apparatus according to claim 1, wherein the arm portion includes a pair of arm portions.

7. The part supplying and press-fitting apparatus according to claim 1, wherein the rotation device and the stop device constitute parts of a common drive device.

8. A part supplying and press-fitting apparatus for supplying an annular part to a predetermined position and press-fitting the part into a press-fit hole of a work in a state of being positioned in a circumferential direction, the positioning being performed by detecting a detected portion formed in the part; the apparatus comprising:
    a grip device configured to grip the part;
    an arm device having an arm portion configured to receive and grip the part supplied from a part feeder side, reversing the part by 180° around a shaft of a horizontal direction, and to hand the part to the grip device;
    a rotation device configured to rotate the grip device around a hole axis of the part in a state of having gripped the part;
    a detection device having a detection member extending horizontally with respect to the hole axis of the part, the detection member configured to detect the detected portion of the part being rotated by the rotation device;
    a stop device configured to stop the rotation of the grip device when the detected portion is detected;
    a move device configured to move the grip device stopped by the stop device to the predetermined position; and
    a press-fit head configured to descend to the predetermined position and press-fit the part into a press-fit hole of the work,
    wherein the grip device includes a chuck device and a placement table face, the chuck device configured to place the part on the placement table face so that the hole axis of the part extends in a direction perpendicular to the placement table face, and to grip an outer peripheral face of the part,
    wherein the grip device is adapted to continuously grip the part during rotation of the grip device, during detection of the detected portion, and during movement of the grip device to the predetermined position, thereby preventing positional displacement of the part, and enabling the part to be properly press-fitted into the press-fitting hole,
    wherein the detected portion includes a cutout formed at a rim of the part, and
    wherein the detection device freely ascends and descends, is contacted with a pressure to the rim in descent, and the detection member engages with the cutout.

9. The part supplying and press-fitting apparatus according to claim 8, wherein seen in a plan view, a supply path of the part is formed in a line from a position, where the arm portion of the arm device receives the part, to the predetermined position below the press-fit head.

10. The part supplying and press-fitting apparatus according to claim 8, wherein the work is a connecting rod, which is a component of an engine of a vehicle, and the part is a bush.

11. The part supplying and press-fitting apparatus according to claim 8, wherein the rotation device and the stop device constitute parts of a common drive device.

12. A part supplying and press-fitting apparatus for supplying an annular part to a predetermined position and press-fitting the part into a press-fit hole of a work in a state of being positioned in a circumferential direction, the positioning being performed by detecting a detected portion formed in the part; the apparatus comprising:

a grip device configured to grip the part;

an arm device having an arm portion configured to receive and grip the part supplied from a part feeder side, reversing the part by 180° around a shaft of a horizontal direction, and to hand the part to the grip device;

a rotation device configured to rotate the grip device around a hole axis of the part in a state of having gripped the part;

a detection device configured to detect the detected portion formed on an upper circular rim of the part being rotated by the rotation device;

a stop device configured to stop the rotation of the grip device when the detected portion is detected;

a move device configured to move the grip device stopped by the stop device to the predetermined position; and a press-fit head configured to descend to the predetermined position and press-fit the part into a press-fit hole of the work, wherein the grip device includes a chuck device and a placement table face, the chuck device configured to place the part on the placement table face so that the hole axis of the part extends in a direction perpendicular to the placement table face, and to grip an outer peripheral face of the part, wherein the grip device is adapted to continuously grip the part during rotation of the grip device, during detection of the detected portion, and during movement of the grip device to the predetermined position, thereby preventing positional displacement of the part, and enabling the part to be properly press-fitted into the press-fitting hole, wherein the detected portion includes a cutout formed on the rim of the part, and wherein the detection device freely ascends and descends, is contacted with a pressure to the rim in descent, and comprises a detection member that engages with the cutout.

13. The part supplying and press-fitting apparatus according to claim 12, wherein seen in a plan view, a supply path of the part is formed in a line from a position, where the arm portion of the arm device receives the part, to the predetermined position below the press-fit head.

14. The part supplying and press-fitting apparatus according to claim 12, wherein the work is a connecting rod, which is a component of an engine of a vehicle, and the part is a bush.

* * * * *